(12) United States Patent
Crawford et al.

(10) Patent No.: US 7,413,090 B2
(45) Date of Patent: *Aug. 19, 2008

(54) LIQUID FILTER WITH DIRECTIONAL FLUID INSERT

(75) Inventors: Brian Scott Crawford, Bessemer City, NC (US); Robert H. Ferguson, Gastonia, NC (US)

(73) Assignee: Wix Filtration Corp LLC, Gastonia, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/712,323

(22) Filed: Feb. 28, 2007

(65) Prior Publication Data

US 2007/0205147 A1    Sep. 6, 2007

Related U.S. Application Data

(63) Continuation of application No. 10/721,258, filed on Nov. 26, 2003, now Pat. No. 7,232,035.

(51) Int. Cl.
*B01D 35/00* (2006.01)

(52) U.S. Cl. .................. 210/456; 210/232; 210/320

(58) Field of Classification Search .......... 210/232, 210/304, 320, 435, 443, 497.01, 493.1, 493.2, 210/437, 440, 456, 512.1, DIG. 17
See application file for complete search history.

(56) References Cited

U.S. PATENT DOCUMENTS

| | | | |
|---|---|---|---|
| 2,313,896 A | 3/1943 | Scheble | |
| 3,370,707 A | 2/1968 | Nordstrom | |
| 3,508,383 A | 4/1970 | Humbert, Jr. et al. | |
| 4,298,465 A * | 11/1981 | Druffel | 210/304 |
| 4,569,759 A | 2/1986 | Ben Aim et al. | |
| 5,785,850 A * | 7/1998 | Lynch et al. | 210/304 |
| 5,938,921 A * | 8/1999 | Janik et al. | 210/304 |
| 5,985,144 A * | 11/1999 | Janik et al. | 210/233 |
| 6,423,225 B2 * | 7/2002 | Wong et al. | 210/304 |
| 6,488,848 B1 | 12/2002 | Smith | |
| 6,520,902 B1 * | 2/2003 | Brown et al. | 494/24 |
| 6,540,914 B1 | 4/2003 | Smith | |
| 6,761,822 B1 * | 7/2004 | Rhyne et al. | 210/323.2 |
| 7,108,139 B2 * | 9/2006 | Nguyen | 210/437 |
| 7,232,035 B1 * | 6/2007 | Crawford et al. | 210/456 |

* cited by examiner

*Primary Examiner*—John Kim
(74) *Attorney, Agent, or Firm*—Honigman Miller Schwartz & Cohn LLP (57) ABSTRACT

A filter assembly for removing particulate contaminants from a fluid, comprises a annular filter element having first and second ends, a filter housing containing the filter element and having first and second ends and a substantially cylindrical side wall defining an annular space between the side wall and the filter element, an end plate secured to the first end of the filter housing and having at least one fluid inlet therethrough adjacent to the first end of the filter element so that the fluid enters the filter housing through the at least one fluid inlet and flows into the annular space, and a directional fluid insert having at least one of fm disposed between the first end of the filter element and the end plate. The fins provided to cause the fluid entering the filter housing through the at least one fluid inlet to swirl around the filter element.

31 Claims, 8 Drawing Sheets

LIQUID FILTER WITH DIRECTIONAL FLUID INSERT

RELATED APPLICATION

This application is a continuation application of U.S. patent application Ser. No. 10/721,258 filed Nov. 26, 2003, now issued U.S. Pat. No. 7,232,035.

BACKGROUND OF THE INVENTION

1. Field of the Invention

This invention relates in general to liquid filters, and in particular to a liquid filter provided with a directional fluid insert acting as a centrifugal separator.

2. Description of the Prior Art

Liquid filters are well known in the prior art and are widely used in a variety of machinery such as internal combustion engines, to filter various fluids. With internal combustion engines, fuel and lubricating oil are filtered, especially if the internal combustion engine is used to drive a vehicle. Other fluids are also filtered, such as, for example but not limited to, transmission fluid, coolant, hydraulic fluid, various chemical solutions and even drinking water.

In internal combustion engines used in vehicles, there is an overall need to conserve space in engine compartments, and drive train areas, as well as to reduce weight or at least to avoid increases in weight wherever possible. It is also desirable for many reasons to increase filter capacity, extend the life of filter media and where possible, to reduce the amount of area utilized by filter media. It is also highly desirable to provide even flow distribution of particles into the filter media which increases the filter media capacity, increases the life of the filter media and reduces the area consumed by the filter media. These various objectives frequently in conflict with one another and present challenges in the art of filter design.

SUMMARY OF THE INVENTION

The present invention provides a new and improved filter assembly for filtering a fluid, such as lubricating oil of internal combustion engines. The filter assembly is provided to enhance a capacity and life of a filter media used therein while still providing for an even distribution of particles stopped by the filter media.

The filter assembly in accordance with the preferred embodiment of the present invention includes a substantially annular filter element having first and second ends, a filter housing containing the filter element and having a first end, a second end and a substantially cylindrical side wall defining an annular space between the side wall and the filter element, and an end plate secured to the first end of the filter housing. The end plate has at least one fluid inlet therethrough adjacent to the first end of the filter element so that the fluid enters the filter housing through the at least one fluid inlet and flows into the annular space. The filter assembly of the present invention further includes a directional fluid insert having at least one fin disposed between the first end of the filter element and the end plate. Preferably, the directional fluid insert has a plurality of fins provided to cause the fluid entering the filter housing through at least one fluid inlet to swirl around the filter element.

The fins each have upstream and downstream edges and are each canted with respect to a central axis of the filter assembly. Furthermore, the fins are spaced from one another to provide slots therebetween, whereby when the fluid enters the first end of the filter housing, it passes through the slots between the fins and the fluid spirals around the filter element prior to passing therethrough.

Preferably, the filter housing is oriented vertically, the first end being at the top and the second end at the bottom, whereby as the liquid enters the top of the housing, a spiral motion is imparted to the fluid to be filtered by the directional fluid insert to precipitate relatively heavy particles which thereafter accumulate at the second end of the filter housing.

Therefore, the filter assembly in accordance with the present invention substantially a capacity and life of a filter assembly. The filter assembly of the present invention accommodates the directional fluid insert having larger fins than the filter assemblies of the prior art, thus allowing the stronger spiral motion imparted to the fluid to be filtered by the directional fluid inserts.

Upon further study of the specification and appended claims, further features and advantages of this invention will become apparent to those skilled in the art.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Referring now mainly to FIGS. 1-5, a filter assembly 10, to which the present invention can be applied, adapted to filter various fluids, such as lubricating oil of internal combustion engines. The filter assembly 10 of the present invention includes a substantially cylindrical filter housing 12 and a substantially annular filter element 14 disposed within the filter housing 12. The filter element 14 is made of a conventional pleated paper filter media 15 or some other filter material. The annular filter element 14 is concentric to a central axis 16 of the filter assembly 10 and has a hollow core 18. The filter element 14 further includes end caps 21a and 21b attached to the filter media 15 at the-opposite ends thereof.

The filter housing 12 of the filter assembly 10 has a first end 20a and a second end 20b, and is formed by a substantially cylindrical side wall 24 open at the first end 20a of the filter housing 12 and closed at the second end 20b thereof by an end wall 25 formed unitary with the side wall 24 at the second end 20b of the filter housing 12. Correspondingly, the filter element 14 has a first end 14a and a second end 14b. The side wall 24 of the filter housing 12 is spaced from the filter media 15 of the filter element 14 by an annular space 26 while the first end 20a of the filter housing 12 is spaced from the filter element 14 by a first axial end space 28. A second axial end space 30 is disposed between the filter element 14 and the end wall 25 of the filter housing 12.

Figure 1:
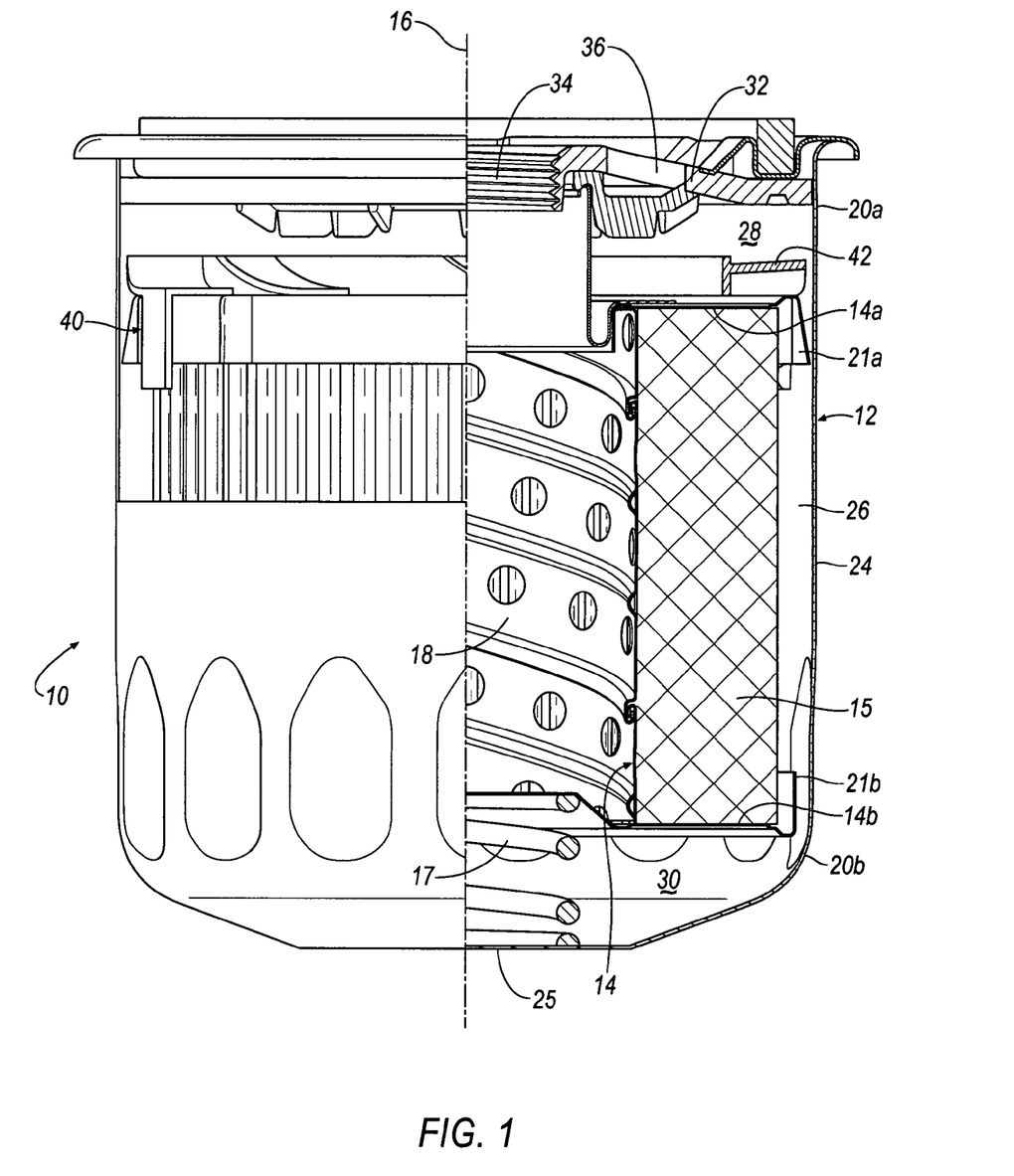
FIG. 1 is a partial cross-sectional view of a filter assembly in accordance with the present invention.
Figure 2:
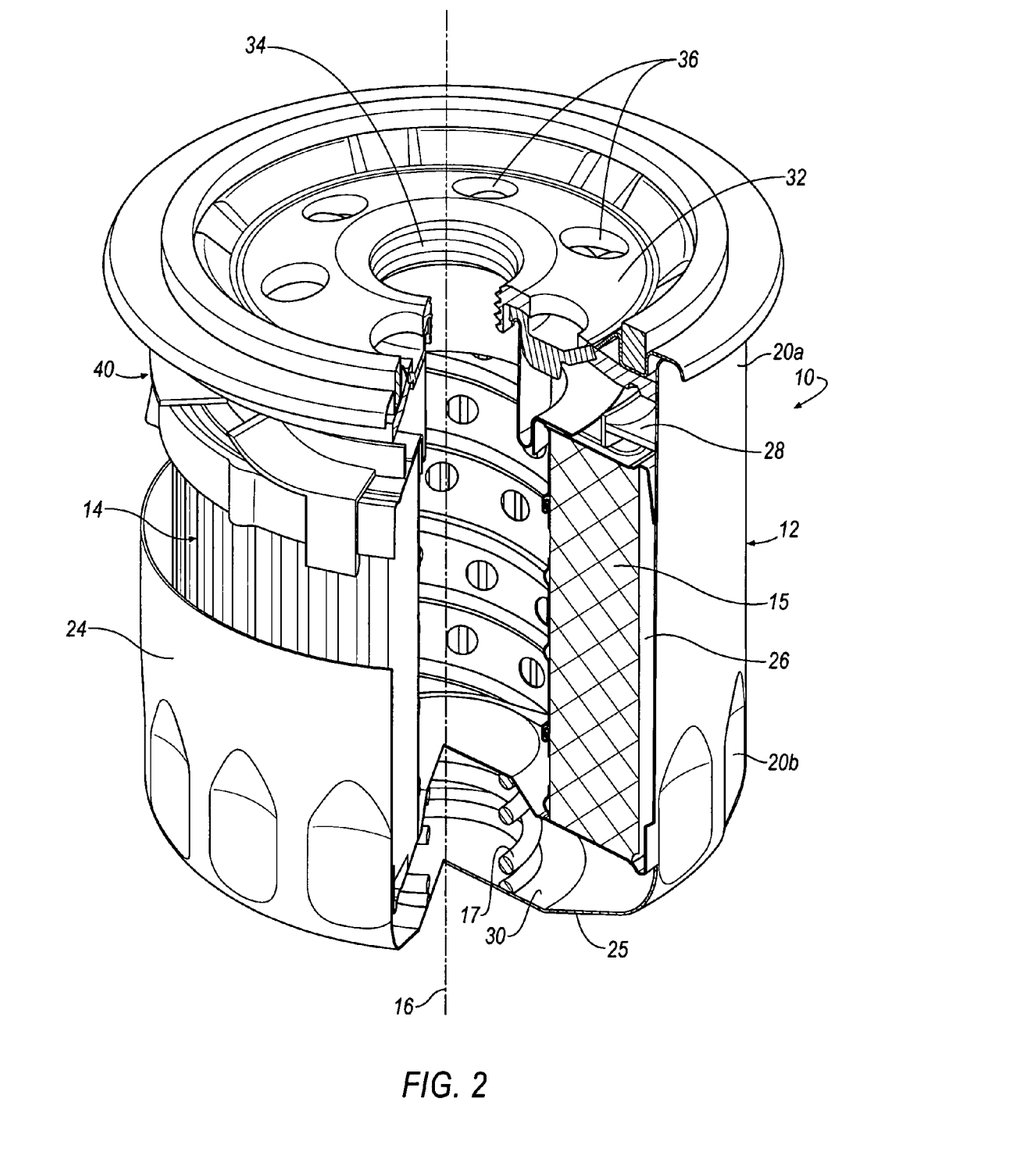
FIG. 2 is a partially cut-away perspective view of a first end of the filter assembly in accordance with the present invention.
Figure 3:
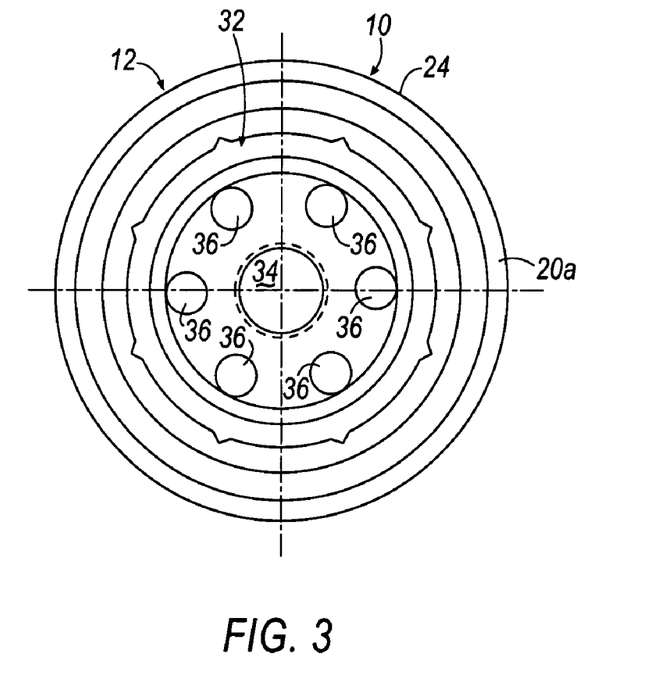
FIG. 3 is an end view of a first end of the filter assembly in accordance with the present invention.
Figure 4:
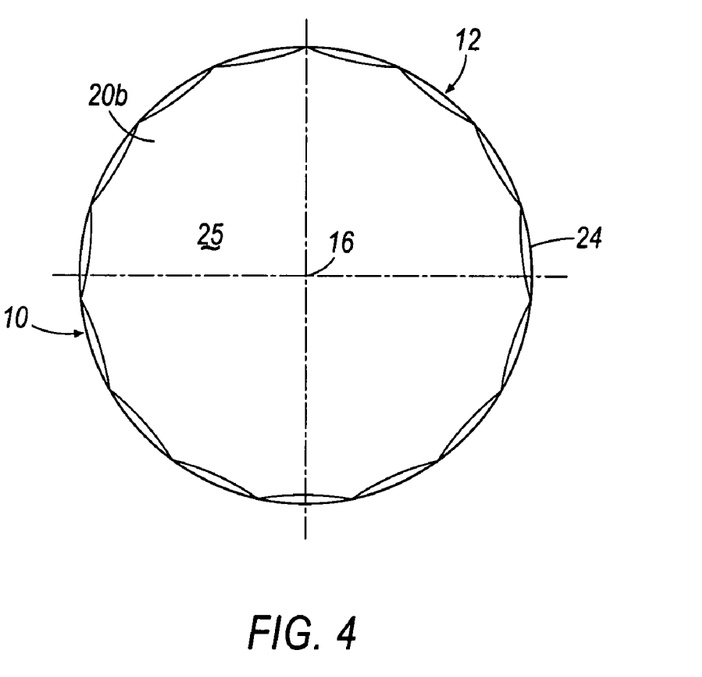
FIG. 4 is an end view of a second end of the filter assembly in accordance with the present invention.
Figure 5:
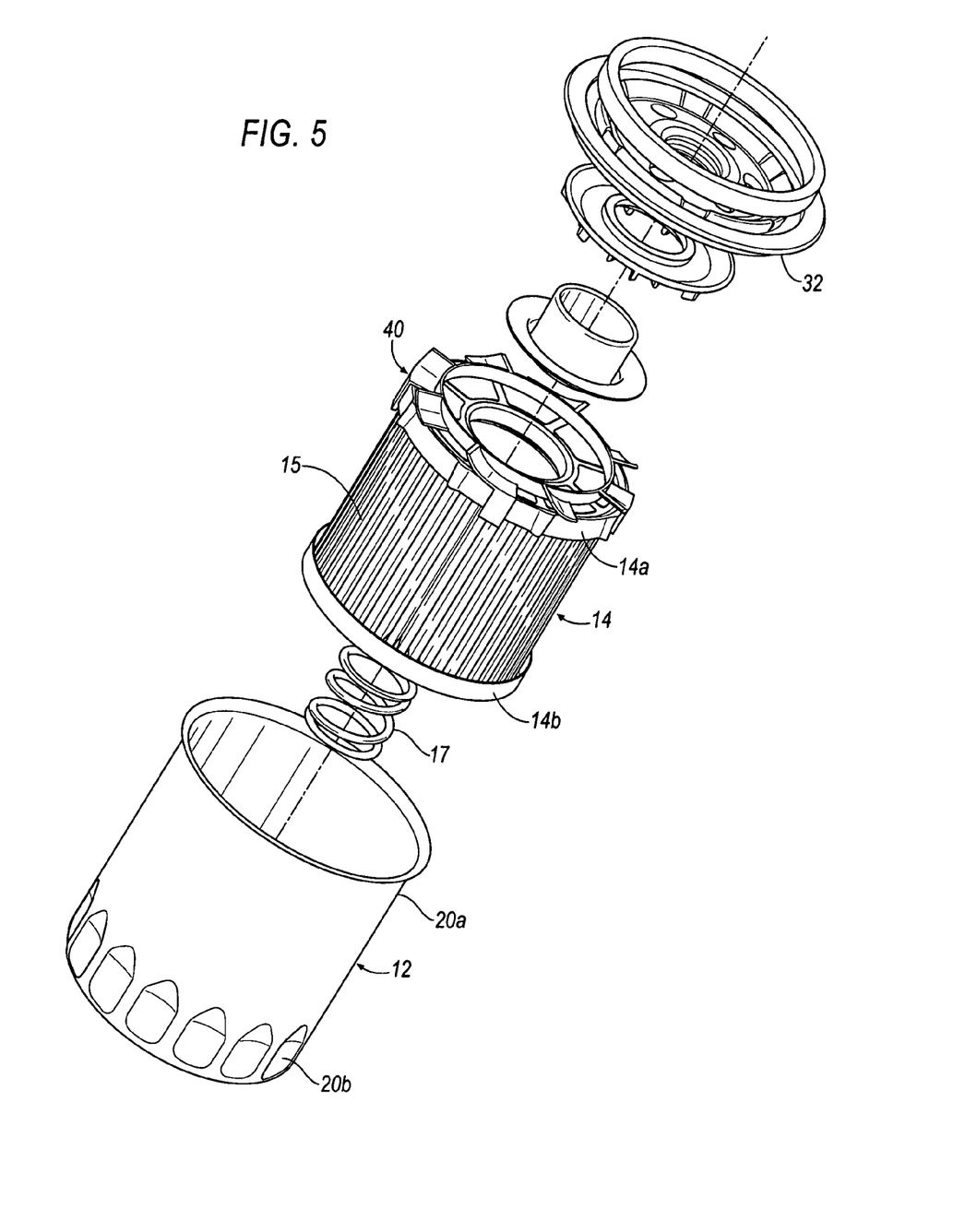
FIG. 5 is an exploded perspective view of the filter assembly in accordance with the present invention.

Closing the first end 20 of the filter housing 12 is an end plate 32 having a threaded central fluid outlet 34 and at least one fluid inlet 36. Preferably, the end plate 32 has a plurality of spaced fluid inlets 36. The spaced fluid inlets 36 communicate with the first axial end space 28 while the threaded central outlet 34 is in communication with the hollow core 18 of the filter element 14. As illustrated in FIG. 1, the end plate 32 is spaced from the filter element 14 by the first axial end space 28. As further illustrated in FIG. 1, the end plate 32 is mounted adjacent to the first end 14a of the filter element 14. The filter assembly 10 further includes a coil spring 17 provided to bias the filter element 14 to seat against the end plate 32.

Accordingly, in operation, the fluid to be filtered enters the housing 12 of the filter assembly 10 through the inlets 36 and flows into the first axial end space 28. The fluid to be filtered then fills the annular space 26 and the second axial end space 30. Since the fluid is under pressure, it then passes through the filter media 15 into the hollow core 18 on the clean side of the filter assembly 10 and exits through the central threaded opening 34.

The filter assembly 10 of the present invention further comprises a directional fluid insert 40 attached to the first end 14a of the filter element 14. The directional fluid insert 40 has a plurality of fluid deflector fins 42 disposed between the first end 14a of the filter element 14 and the end plate 32. In accordance with the principles of the present invention, the fluid is caused to rotate around the central axis 16 as it passes from the first axial end space 28 into the annular space 26 by the plurality of fins 42 of the directional fluid insert 40, which are disposed within the first axial end space 28. As the liquid rotates, it spirals toward the second end 20b of the filter housing 12 and as the fluid spirals, centrifugal force is applied to contaminants entrained in the fluid to be filtered. The centrifugal force causes relatively heavy contaminants, such as particles, to migrate toward the inner surface of the cylindrical wall 24 and to be carried by the spiraling fluid toward the second axial end space 30. In the second axial end space 30, the contaminant particles accumulate on an inner surface of the end wall 25 of the housing 12 so as not to impact the filter media 15. If the particles do not impact the filter media 15, they do not become lodged in the filter media 15 and therefore do not clog the filter media 15.

Preferably, as is illustrated in FIG. 1, the filter assembly 10 is oriented with the axis 16 extending substantially vertically so that gravity keeps the contaminant particles which have accumulated in the second axial end space 30 at the second end 20b of the filter housing 12 when the machine or engine is at rest. When the engine or machine is running so that the liquid is circulating around the filter media 15, heavy particles are continually encouraged by centrifugal force to migrate toward an inner peripheral surface of the cylindrical wall 24 and thus to settle in the second axial end space 30 at the lower end 20b of the filter housing 12.

Figure 6:
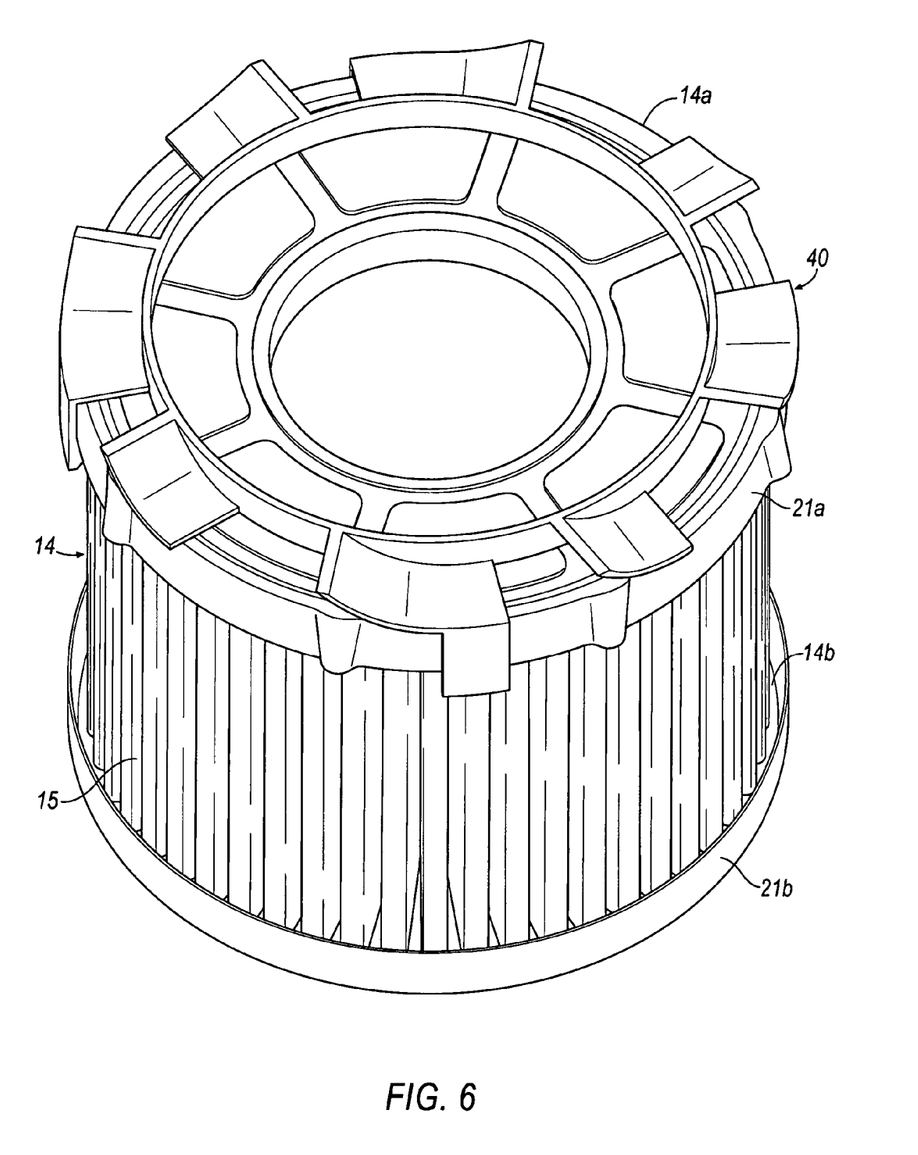
FIG. 6 is a perspective view of a filter element in combination with a directional fluid insert in accordance with the first exemplary embodiment of the present invention.
Figure 7:
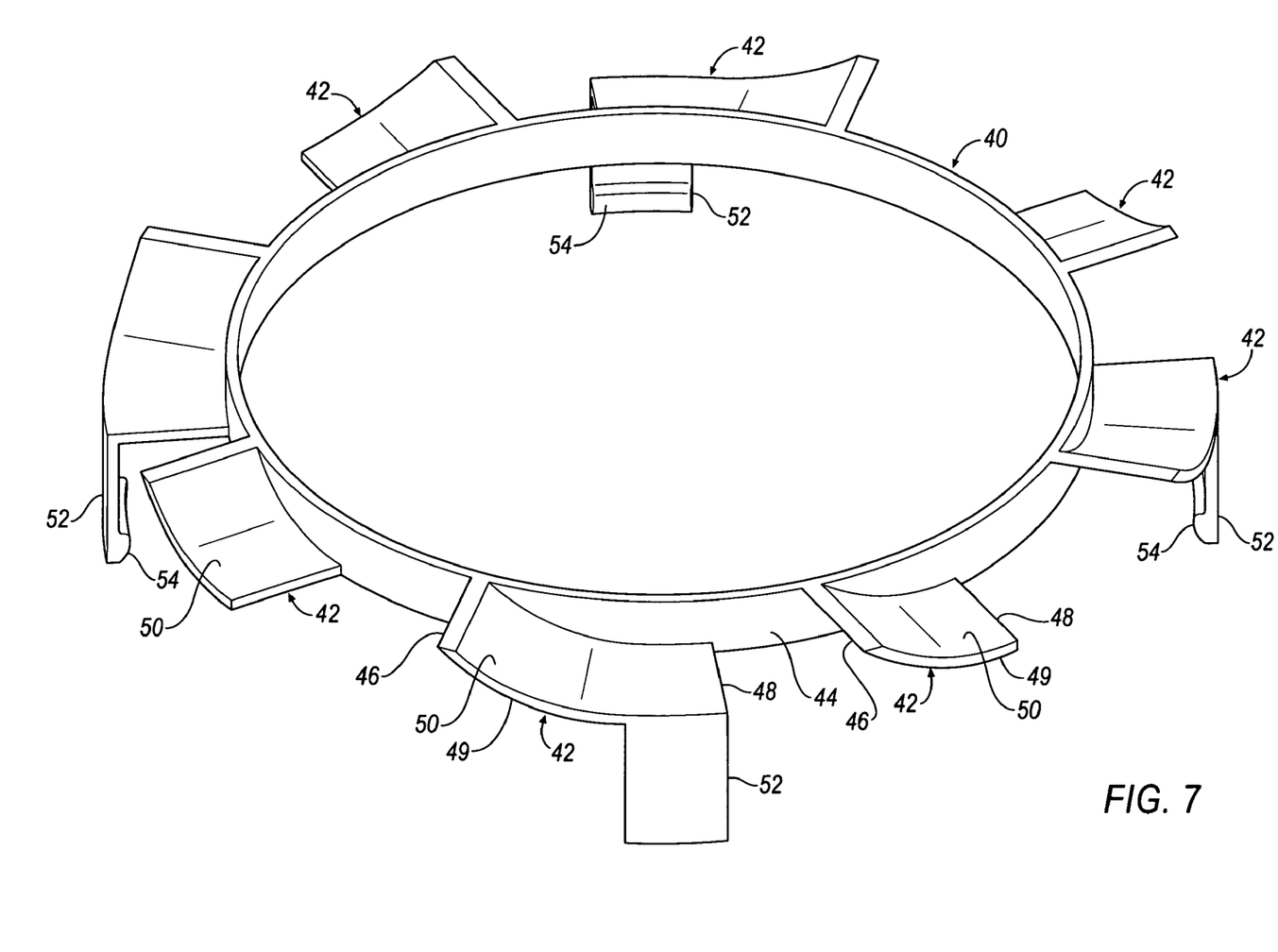
FIG. 7 is a perspective view of the directional fluid insert in accordance with the first exemplary embodiment of the present invention.
Figure 9:
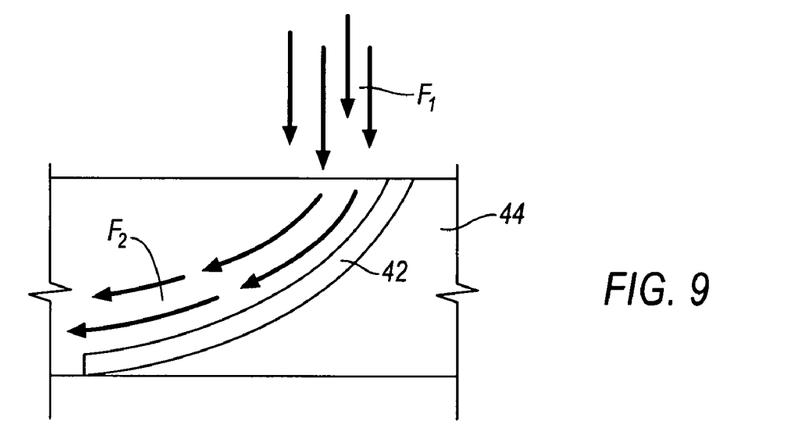
FIG. 9 is a side view showing a single fin of the directional fluid insert in accordance with the first exemplary embodiment of the present invention and a portion of a base upon which the fin is mounted.

Referring now to FIGS. 6, 7 and 9 illustrating the directional fluid insert 40 in accordance with the first exemplary embodiment of the present invention, the directional fluid insert 40 includes a substantially annular base ring 44 formed integrally with the plurality of the fluid deflector fins 42 extending radially outwardly therefrom and circumferentially spaced from each other. Each of the fins 42 has an upstream edge 46 and a downstream edge 48 with a substantially curved fluid deflecting surface 50. Preferably the curved surface 50 is concave.

As the fins 42 spaced from one another, they define curved slots therebetween that extend between downstream edges 48 and upstream edges 46 of the fins 42. When fluid under pressure flows from the inlets 36 into the first annular end space 28 (fluid flow direction $F_1$), the fluid flow under pressure necessarily is given a circular component as the fluid deflects and flows through the slots between the fins 42 into the annular space 26 (fluid flow direction $F_2$). Thus, the fins 42 deflect the incoming fluid flow and causes that fluid to swirl around the filter element 14.

Preferably, the directional fluid insert 40 is secured to the first end 14a of the filter element 14 by a snap-fit connection. For this purpose, as shown in FIGS. 6 and 7, the directional fluid insert 40 is formed integrally with a plurality of axially extending mounting tabs 52 having a spring resilience. Preferably, the mounting tabs 52 are made of resilient plastic material. As can be seen in FIG. 7, each of mounting tabs 52 has a detent, such as a bulged leading edge 54 provided at a distal end thereof, adapted to securely engage the end cap 21a at the first end 14a of the filter element 14 by the snap-fit connection, as illustrated in FIGS. 1 and 6. Preferably, the mounting tabs 52 extend substantially parallel to the axis 16 from free edges 49 of the fins 42. It will be appreciated by those skilled in the art that any other appropriate manner of securing the directional fluid insert 40 to the first end 14a of the filter element 14, such as adhesive bonding, is within the scope of the present invention.

Further preferably, the directional fluid insert 40 is a single-piece plastic molding made of resilient plastic material so that it frictionally retains itself around the filter element or by the snap-fit connection. It will be appreciated by those skilled in the art that any other material and/or method of manufacturing of the directional fluid insert will be within the scope of the present invention.

Figure 8:
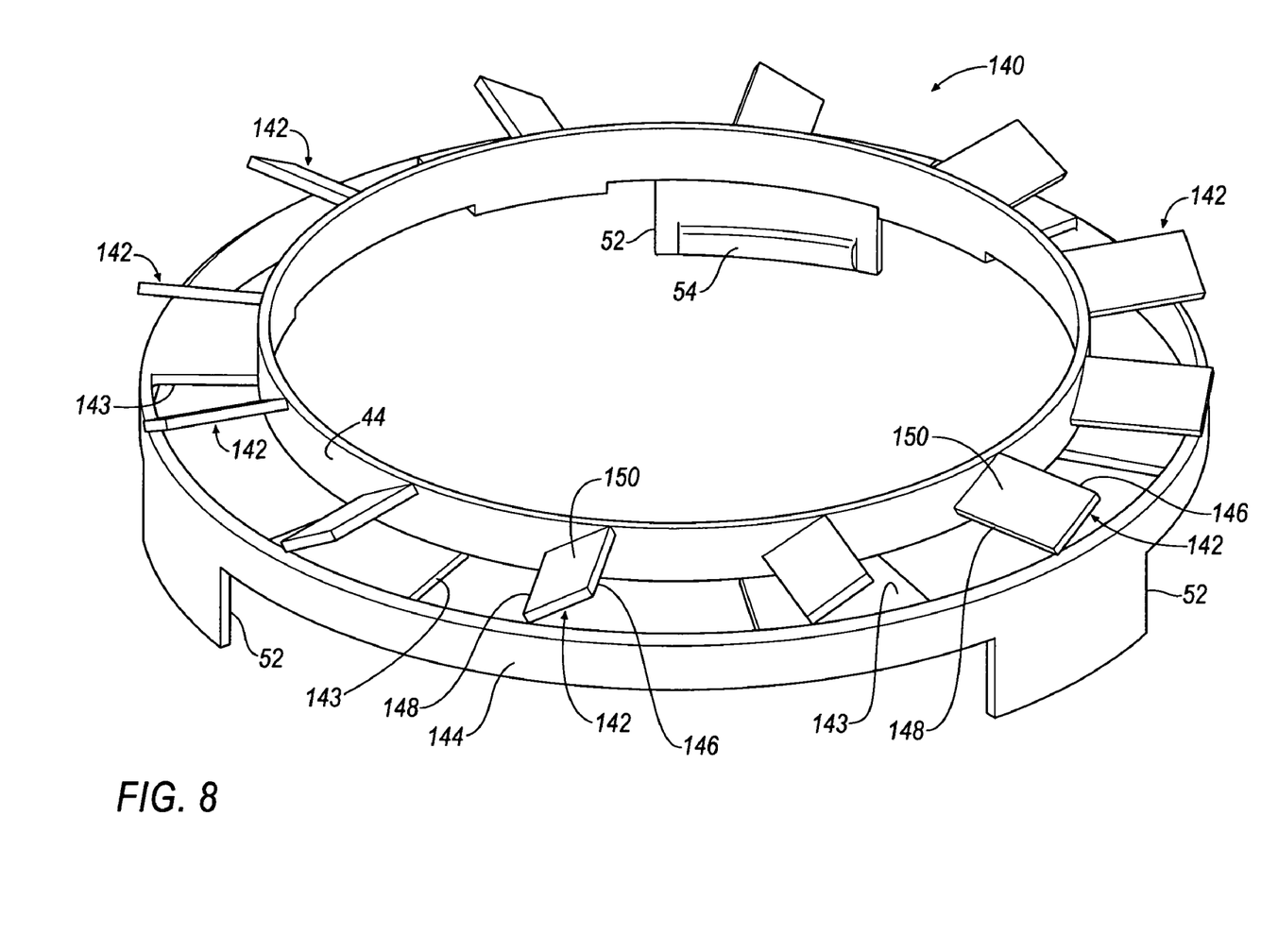
FIG. 8 is a perspective view of the directional fluid insert in accordance with the second exemplary embodiment of the present invention.
Figure 10:
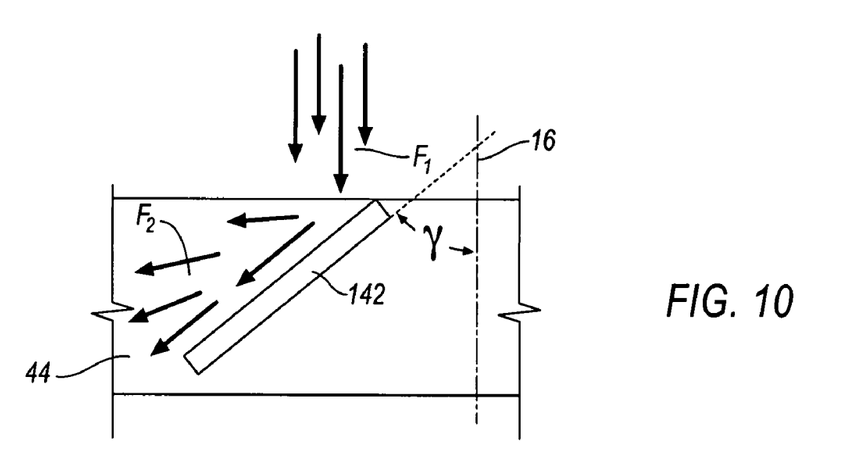
FIG. 10 is a side view showing a single fin of the directional fluid insert in accordance with the second exemplary embodiment of the present invention and a portion of a base upon which the fin is mounted.

FIGS. 8 and 10 illustrate a directional fluid insert 140 in accordance with the second exemplary embodiment of the present invention. Components, which are unchanged from, or function in the same way as in the exemplary embodiment depicted in FIGS. 6, 7 and 9 are labeled with the same reference characters.

In accordance with the second embodiment of the present invention, the directional fluid insert 140 includes a substantially annular base ring 44 and a substantially annular outer ring 144 integrally connected by a plurality of radial ridges 143. The base ring 44 is further formed integrally with the plurality of radially extending fins 142 circumferentially spaced from each other. Each of the fins 142 has an upstream edge 146 and a downstream edge 148 with a substantially flat fluid deflecting surface 150. Each of the fins 142 is canted at an angle γ with respect to the central axis 16 of the filter assembly 10 and the filter element 16. Since the fins 142 are both canted and spaced from one another, they define canted slots therebetween that extend between the upstream edges 146 and the downstream edges 148 of the fins 142. When fluid under pressure flows from the inlets 36 into the first annular end space 28 (fluid flow direction $F_1$), the fluid flow under pressure necessarily is given a circular component as the fluid flows through the slots between the fins 42 into the annular space 26 (fluid flow direction $F_2$).

The directional fluid insert 140 can be snap-fitted over the first end 14a of the filter element 14 by a snap-fit connection. For this purpose, as shown in FIG. 8, the directional fluid insert 140 is formed integrally with a plurality of axially extending mounting tabs 52 having a spring resilience so that they can frictionally retain the directional fluid insert 140 on the filter element 14. Preferably, the mounting tabs 52 are made of resilient plastic material. Each of mounting tabs 52 has a detent, such as a bulged leading edge 54 provided at a distal end thereof, adapted to securely engage the end cap 21a at the first end 14a of the filter element 14 by the snap-fit connection. Preferably, the mounting tabs 52 extend substantially parallel to the axis 16 from outer ring 144 of the directional fluid insert 140.

Further preferably, the directional fluid insert 140 is a single-piece plastic molding. It will be appreciated by those skilled in the art that any other material and/or method of manufacturing of the directional fluid insert will be within the scope of the present invention.

Figure 11:
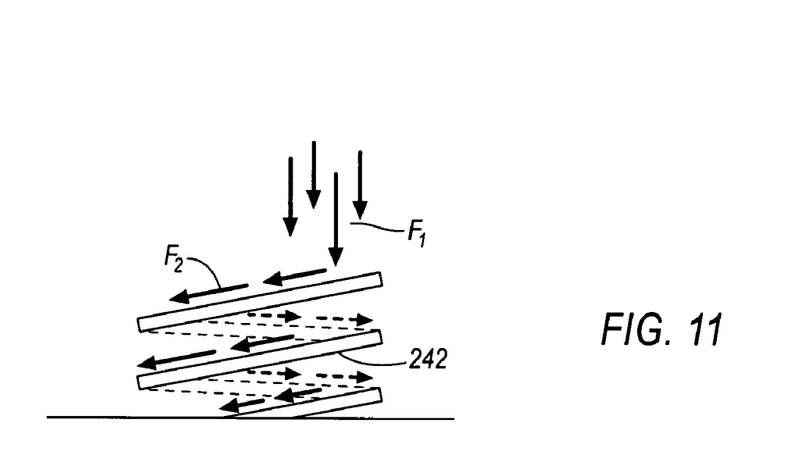
FIG. 11 is a side view showing a single fin of the directional fluid insert in accordance with the third exemplary embodiment of the present invention and a portion of a base upon which the fin is mounted.

While the first and second exemplary embodiments of the directional fluid insert are preferable configurations of the present invention to make the fluid flowing into the filter assembly 10 spiral around the filter element 14, other arrangements may be utilized to accomplish this. For example, as illustrated in FIG. 11, instead of the plurality of separate fins, the directional fluid insert may have a single fluid deflector fin in the form of a continuous spiral strip 242 causing the axial inlet fluid flow (fluid flow direction $F_1$) to deflect and spiral in the direction $F_2$. It is also possible to have the deflector fins 42 to project radially inwardly from the base ring 44.

The exemplary embodiments of the present invention described hereinabove provide a convenient way to mount the directional fluid insert to the filter element because very little, if any, manufacturing steps need to be changed other than the assembly step of snap-fitting the directional fluid insert over the first end of the filter element.

By the foregoing arrangements that allow to employ larger deflector fins than the prior art filters, the capacity of the filter assembly of the present invention is increased and the filter media usage is expanded without adding additional filter media material.

The liquid being filtered and cleared of particulate contamination may be lubricating oil, fuel, coolant, hydraulic fluid, transmission fluid, or other liquids used for various purposes and various types of machines and engines.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A component of a filter assembly disposed proximate a filter element, comprising:
    a directional fluid insert including,
        a base ring including
            an inner circumferential surface, and
            an outer circumferential surface;
        at least one fluid-directing fin extending radially from said outer circumferential surface, wherein the at least one fluid-directing fin includes
            an axial upstream surface,
            a radial downstream surface, and
            a circumferential outer side surface; and
        one or more mounting tabs that extending axially from the radial downstream surface and the circumferential outer side surface of the at least one fluid-directing fin.

2. The component of a filter assembly as defined in claim 1, wherein said one or more axially-extending mounting tabs define
    means for radially securing by way of snap fit coupling said directional fluid insert to said component of the filter assembly.

3. The component of a filter assembly as defined in claim 2, wherein said one or more axially-extending mounting tabs include
    a radially-inward-extending detent having
        a bulged leading edge provided at a distal end of said one or more axially-extending mounting tabs that are adapted to radially engage said component of said filter assembly.

4. The component of a filter assembly as defined in claim 1, wherein said at least one fluid-directing fin of said directional fluid insert further includes
    an axial, substantially curved fluid deflecting surface, wherein the axial, substantially curved fluid deflecting surface connects and extends between said axial upstream surface and said radial downstream surface.

5. The component of a filter assembly as defined in claim 1, wherein said at least one fluid-directing fin of said directional fluid insert further includes
    an axial, substantially flat fluid deflecting surface canted at an angle with respect to a central axis of said filter assembly, wherein the axial, substantially flat fluid deflecting surface connects and extends between said axial upstream surface and said radial downstream surface.

6. The component of a filter assembly as defined in claim 1, wherein said at least one fluid-directing fin of said directional fluid insert is in the form of a continuous spiral strip.

7. The component of a filter assembly as defined in claim 1, wherein said at least one fluid-directing fin includes a plurality of fluid-directing fins that are circumferentially spaced from one another about said outer circumferential surface of said base ring, wherein said plurality of fluid-directing fins extend substantially radially from said outer circumferential surface of said base ring.

8. The component of a filter assembly as defined in claim 1, wherein the one or more mounting tabs have a spring resistance.

9. The component of a filter assembly as defined in claim 1, wherein said directional fluid insert is formed as a single-piece plastic molding.

10. A component of a filter assembly disposed proximate a filter element, comprising:
    a directional fluid insert including,
        a base ring including
            a first inner circumferential surface, and
            a first outer circumferential surface;
        at least one fluid-directing fin extending radially from said outer circumferential surface, wherein the at least one fluid-directing fin includes an upstream surface,
a downstream surface, and
a circumferential outer side surface; and
an outer ring including
a second inner circumferential surface, and
a second outer circumferential surface, wherein the second inner circumferential surface of said outer ring is integrally-connected to said first outer circumferential surface of said base ring.

11. The component of a filter assembly as defined in claim 10, wherein the outer ring includes an upper axial surface and a lower axial surface, wherein the filter assembly further comprises:
one or more mounting tabs axially-extending from said lower axial surface of said outer ring.

12. The component of a filter assembly as defined in claim 11, wherein said one or more axially-extending mounting tabs define
means for radially securing by way of snap fit coupling said directional fluid insert to said component of the filter assembly.

13. The component of a filter assembly as defined in claim 12, wherein said one or more axially-extending mounting tabs include
a radially-inward-extending detent having
a bulged leading edge provided at a distal end of said one or more axially-extending mounting tabs that are adapted to radially engage said component of said filter assembly.

14. The component of a filter assembly as defined in claim 11, wherein the one or more mounting tabs have a spring resistance.

15. The component of a filter assembly as defined in claim 10, wherein said at least one fluid-directing fin of said directional fluid insert further includes
an axial, substantially curved fluid deflecting surface, wherein the axial, substantially curved fluid deflecting surface connects and extends between said upstream surface and said downstream surface.

16. The component of a filter assembly as defined in claim 10, wherein said at least one fluid-directing fin of said directional fluid insert further includes
an axial, substantially flat fluid deflecting surface canted at an angle with respect to a central axis of said filter assembly, wherein the axial, substantially flat fluid deflecting surface connects and extends between said upstream surface and said downstream surface.

17. The component of a filter assembly as defined in claim 10, wherein said at least one fluid-directing fin of said directional fluid insert is in the form of a continuous spiral strip.

18. The component of a filter assembly as defined in claim 10, wherein said at least one fluid-directing fin includes a plurality of fluid-directing fins that are circumferentially spaced from one another about said outer circumferential surface of said base ring, wherein said plurality of fluid-directing fins extend substantially radially from said outer circumferential surface of said base ring.

19. The component of a filter assembly as defined in claim 10, wherein said directional fluid insert is formed as a single-piece plastic molding.

20. The component of a filter assembly as defined in claim 10, wherein the second inner circumferential surface of said outer ring is integrally-connected to said first outer circumferential surface of said base ring by way of a plurality of radial ridges.

21. A component of a filter assembly disposed proximate a filter element, comprising:
a base ring including
an inner circumferential surface, and
an outer circumferential surface;
means for rotationally-directing fluid, wherein the means for rotationally-directing fluid extends radially from said outer circumferential surface, wherein the means for rotationally-directing fluid includes
an upstream surface,
a downstream surface, and
a circumferential outer side surface; and
means for radially securing the base ring to said component of the filter assembly, wherein the means for securing extends axially from the downstream surface and the circumferential outer side surface of the means for rotationally-directing fluid.

22. The component of a filter assembly as defined in claim 21, wherein said means for rotationally-directing fluid includes one or more fins, wherein the means for radially securing includes one or more axially-extending mounting tabs.

23. The component of a filter assembly as defined in claim 22, wherein the one or more axially-extending mounting tabs include
a radially-inward-extending detent having
a bulged leading edge provided at a distal end of said one or more axially-extending mounting tabs that are adapted to radially engage said component of said filter assembly.

24. The component of a filter assembly as defined in claim 22, wherein said one or more fins further includes
an axial fluid deflecting surface, wherein the axial, fluid deflecting surface connects and extends between said upstream surface and said downstream surface.

25. The component of a filter assembly as defined in claim 22, wherein said at least one fluid-directing fin includes a plurality of fluid-directing fins that are circumferentially spaced from one another about said outer circumferential surface of said base ring, wherein said plurality of fluid-directing fins extend substantially radially from said outer circumferential surface of said base ring.

26. A component of a filter assembly disposed proximate a filter element, comprising:
a base ring including
a first inner circumferential surface, and
a first outer circumferential surface;
means for rotationally-directing fluid, wherein the means for rotationally-directing fluid extends radially from said outer circumferential surface, wherein the means for rotationally-directing fluid includes
an upstream surface,
a downstream surface, and
a circumferential outer side surface;
an outer ring including
a second inner circumferential surface,
a second outer circumferential surface,
an upper axial surface, and
a lower axial surface, wherein the second inner circumferential surface of said outer ring is integrally-connected to said first outer circumferential surface of said base ring; and
means for radially securing the outer ring to said component of the filter assembly, wherein the means for securing extends axially from the lower axial surface of the outer ring.

27. The component of a filter assembly as defined in claim 26, wherein said means for rotationally-directing fluid includes one or more fins, wherein the means for radially securing includes one or more axially-extending mounting tabs.

28. The component of a filter assembly as defined in claim 27, wherein the one or more axially-extending mounting tabs include a radially-inward-extending detent having a bulged leading edge provided at a distal end of said one or more axially-extending mounting tabs that are adapted to radially engage said component of said filter assembly.

29. The component of a filter assembly as defined in claim 27, wherein said one or more fins further includes an axial fluid deflecting surface, wherein the axial, fluid deflecting surface connects and extends between said upstream surface and said downstream surface.

30. The component of a filter assembly as defined in claim 27, wherein said at least one fluid-directing fin includes a plurality of fluid-directing fins that are circumferentially spaced from one another about said outer circumferential surface of said base ring, wherein said plurality of fluid-directing fins extend substantially radially from said outer circumferential surface of said base ring.

31. The component of a filter assembly as defined in claim 10, wherein the second inner circumferential surface of said outer ring is integrally-connected to said first outer circumferential surface of said base ring by way of a plurality of radial ridges.

* * * * *